Oct. 5, 1965         L. F. STRINGER ETAL         3,210,639
                     POWER CONTROL APPARATUS
Filed June 5, 1962                               3 Sheets-Sheet 1

WITNESSES

INVENTORS
Loren F. Stringer and
Emil T. Schonholzer
BY
ATTORNEY

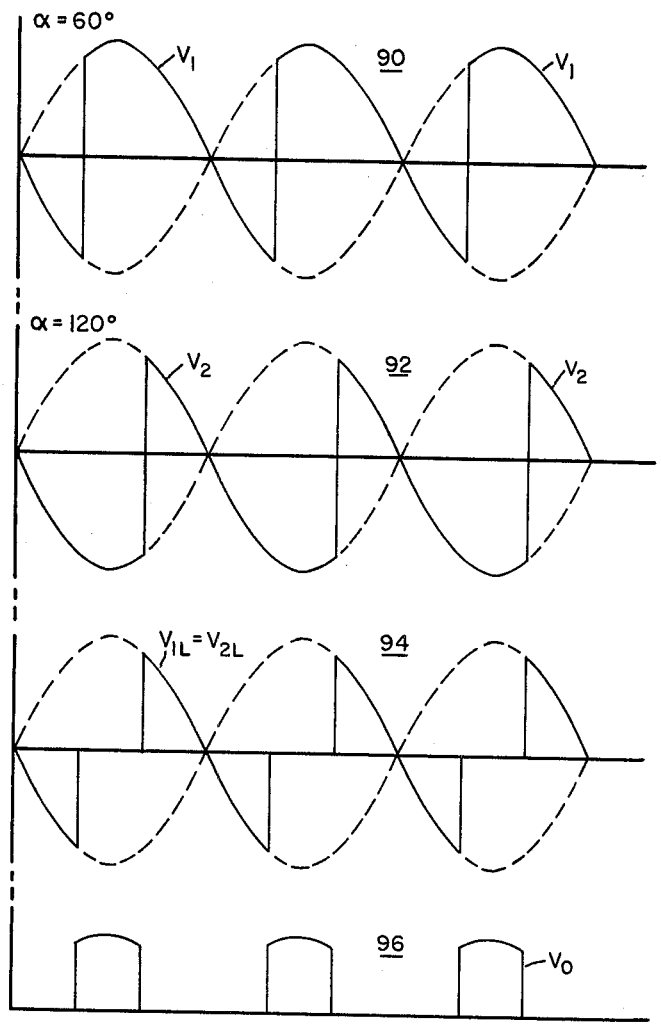
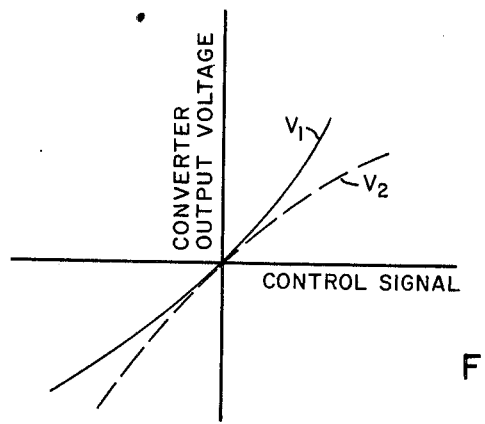
Fig. 3
Fig. 4

United States Patent Office 3,210,639
Patented Oct. 5, 1965

3,210,639
POWER CONTROL APPARATUS
Lorin F. Stringer, Depew, and Emil T. Schonholzer, Williamsville, N.Y., assignors to Westinghouse Electric Corporation, East Pittsburgh, Pa., a corporation of Pennsylvania
Filed June 5, 1962, Ser. No. 200,125
6 Claims. (Cl. 321—18)

The present invention relates in general to power control apparatus, and more particularly to power control apparatus including at least one electrical energy converter device having an adjustable energy conduction.

A converter device is generally known in the prior art to comprise a signal changing device to be operated as a rectifier for rectifying alternating current power from a suitable source for supply to a direct current load or to be operated as an inverter for inverting direct current power from a generating source for supply to an alternating current load. It has been known to arrange two such converter devices in an anti-parallel circuit to operate as a power supply capable of providing voltage and current signals of opposite polarities.

It is an object of the present invention to provide improved power control apparatus including at least one converter device which is better operative to limit over-current conditions in a load circuit and is faster responding and more reliable in operation.

It is an additional object to provide improved power control apparatus including a pair of converter devices arranged to operate better with one as a rectifier while the other operates as an inverter depending upon the direction of the load current and the alternations of the power supply and to better balance the respective currents provided by each such converter device.

It is a further object to provide improved load current control circuit apparatus including at least one converter device having a current conducting member with an adjustable conduction period or firing angle relative to the alternating power supply, wherein a better control of that conduction period is realized in response to any undesired circulating currents within the circuit and better control of the resulting load current is realized.

The present invention relates to power control apparatus including a pair of converter devices arranged in an anti-parallel circuit, such that currents of both polarities are produced for supply to a load device, for example a generator or motor field. Each converter includes at least one silicon semiconductor controlled rectifier device having an adjustable firing angle, the forward conduction characteristic of the latter device is such that it blocks current flow when a positive anode voltage is supplied unless a positive control signal is also applied to the third terminal or gate. The power circuit of each converter device includes a bridge arrangement of silicon controlled rectifier devices which are fired by a pulse position modulator providing output pulses the phase of which can be shifted relative to the applied line voltage. For the purpose of providing a smooth transfer operation between the converters, it is desired that the rectifier voltage of one converter device substantially equal the inverter voltage of the other converter device. By providing current sensing devices for each of the load and the two converter devices and providing the resultant control signals for the converter devices, suitable correction of the firing angles of the converter devices can be effected to control circulating currents and undesired load current values.

The foregoing objects and advantages and the operation of the present invention will become more readily apparent from the following description and accompanying drawings, in which:

FIG. 3 is a curve chart illustrating the operation of the present control apparatus; and FIG. 4 is a curve chart illustrating the transfer curves of the converter devices.

Figure 1:
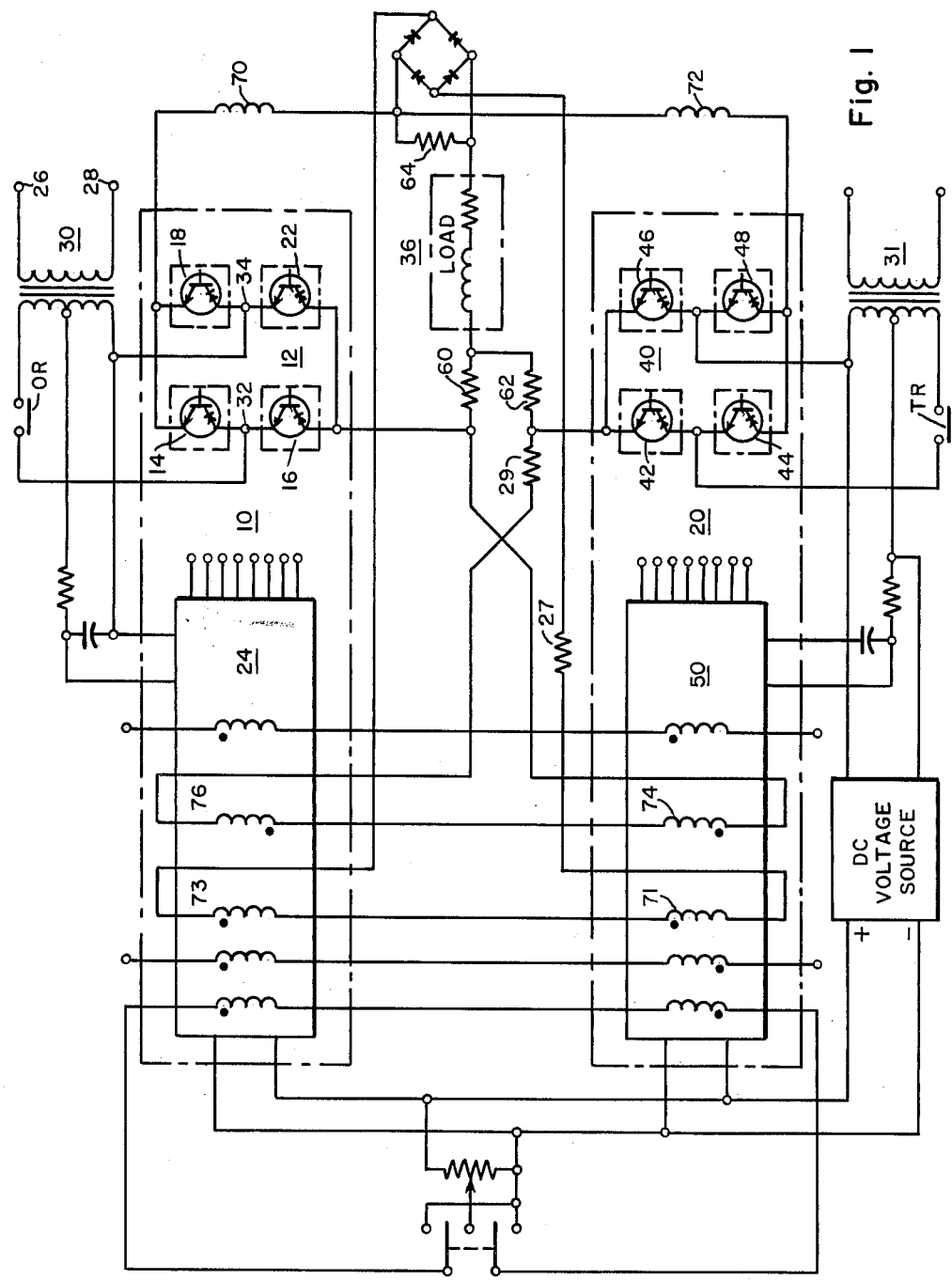
FIGURE 1 is a schematic showing of the power control apparatus in accordance with the present invention.

In FIG. 1 there is shown a first converter device 10 and a similar second converter device 20. The first converter device 10 includes a power circuit 12 built up as a bridge circuit arrangement with each branch of the bridge controllable by a respective silicon controlled rectifier device 14, 16, 18 and 22. The rectifier devices 14, 16, 18 and 22 are fired by means of a pulse position modulator 24 illustrated as a magnetic amplifier which supplies output pulses to the gate elements of the silicon controlled rectifier devices, the phase of which output pulses can be shifted relative to the line voltage by means of a suitable control current in any one of the control windings for the magnetic amplifier 24. The pulse position modulator 24 is shown and described in greater detail in a copending patent application Serial No. 43,515 and filed July 18, 1960, and assigned to the same assignee. It essentially comprises a magnetic amplifier circuit, the first stage of which produces the desired phase shift and a transistorized bistable multivibrator second stage which amplifies and shapes the output pulses. In addition, there is a marker pulse applied to the multivibrator which ensures that the wavefront of the output pulse cannot be shifted beyond a firing angle $\alpha$ of 170°. This is of particular importance relative to the operation of the converter device 10 as an inverter.

A sinusoidal alternating current supply voltage is connected to the terminals 26 and 28. A coupling transformer 30 is operative to supply a 230 volt signal to the respective terminals 32 and 34 of the converter bridge circuit, and also to supply a 115 volt signal of the same phase to the pulse position modulator 24 as a synchronizing signal. At a firing angle $\alpha_1$, a gating pulse is simultaneously applied to the gates of the silicon controlled rectifier devices 14 and 22. This will bring them to the conduction state and the output voltage applied to the load 36 will thereafter follow the A.C. line voltage applied to the terminals 26 and 28. As long as the output voltage supplied to the load 36 is positive, a current will flow to the reactive load circuit and charge up magnetic energy in it. When the output voltage from the bridge circuit 12 reverses its sign, the load reactance will provide the needed voltage to maintain the current flow in the same direction and a part of the previously accumulated energy will be fed back to the line. At 180 electrical degrees after the first pair of silicon controlled rectifier devices 14 and 22 has been fired, a second gating pulse is applied to the second pair of devices 16 and 18 and the output voltage supplied to the load 36 therefore will now commutate to the reversed line voltage from the transformer 30. It is readily seen that the firing angle $\alpha_1$ determines the average output voltage supplied by the bridge circuit 12 to the load 36.

For a firing angle $\alpha$ equal to 90°, the output voltage supplied by the bridge circuit 12 to the load 36 will become zero. For values of $\alpha$ less than 90° the converter device 10 operates in the rectifier mode such that a power transfer takes place from the transformer 30 to the load 36. However, for values of the firing angle $\alpha$ greater than 90° and less than 180° the output voltage from the bridge circuit 12 is reversed and power now will be transferred from the load 36 back to the transformer 30. The latter mode of operation is called inverting and is possible only when the load is active and includes a reactive character in order to smooth the current.

A dual converter is a D.C. power source which can supply voltage and current of either polarity. With two converter devices connected back to back, they will provide the desired dual converter characteristic. The two converter devices are controlled together in such a manner that the firing angle $\alpha_1$, of converter 10 and the firing angle $\alpha_2$ of converter 20 together should add up to 180°. If this condition is met the two average output voltages are always of the same magnitude but have opposing signs as can be seen by a reference to FIG. 3.

FIG. 3 shows the theoretical waveform for a firing angle $\alpha_1$ of 60° and a firing angle $\alpha_2$ of 120°. The converter 10 is here rectifying and the inverter 20 is inverting. Depending on the load, the rectifier or the inverter has to carry the load current. If the load voltage is smaller than $V_1$, the output voltage from the converter 10, which is operating in its rectifying mode, will supply the power to the load. However, if the load voltage exceeds the output voltage $V_1$ of the converter 10, such as would occur when the load is generating, the converter 20 operates as an inverter to feed power back to the supply line. The immediately preceding description assumes that the average voltages and therefore the transfer functions of the two converter devices substantially match. If this is not the case as shown in FIG. 4, a steady circulating current could flow limited only by the internal impedance of the converter devices and the resistance of the line reactors. This is true if the rectifying converter supplies more voltage than the inverting converter can absorb, which would occur when the firing angle $\alpha_1$ plus the firing angle $\alpha_2$ is less than 180°.

The converter device 20 is similar in construction to the converter device 10 and includes a bridge 40 including silicon controlled rectifier devices 42, 44, 46 and 48 connected in a bridge circuit arrangement with the firing angles of the respective silicon controlled rectifier devices 42, 44, 46 and 48 being controlled by a pulse position modulator 50 that includes a magnetic amplifier circuit in the first stage to produce the desired phase shift and a transistorized bistable multivibrator second stage to amplify and shape the output pulses.

The load circuit 36 is illustrated as including a reactive component and a resistive component such as would occur for the case of a generator field winding. In series with the converter device 10 is a resistor or impedance member 60 operative to sense the current supplied by the converter 10 to the load 36. In series with the converter device 20 is a resistor or impedance member 62 operative to sense the current supplied by the converter device 20 to the load 36. In series with the load 36 is a resistor or impedance member 64 operative to sense the load current. The voltage drops across the resistors 60 and 62 are connected in opposition to the input terminals of the control windings 74 and 76 as shown in FIGURE 1. The voltage drop across the resistor 64 is connected to provide an input signal to control winding 71 within converter device 20 and to control winding 73 within converter device 10. The voltage drop across the impedance members 60 and 62 is connected to energize a control winding 74 within the converter device 20 and a control winding 76 within the converter device 10, for determining the firing angles of the respective converting devices 10 and 20.

Figure 2:
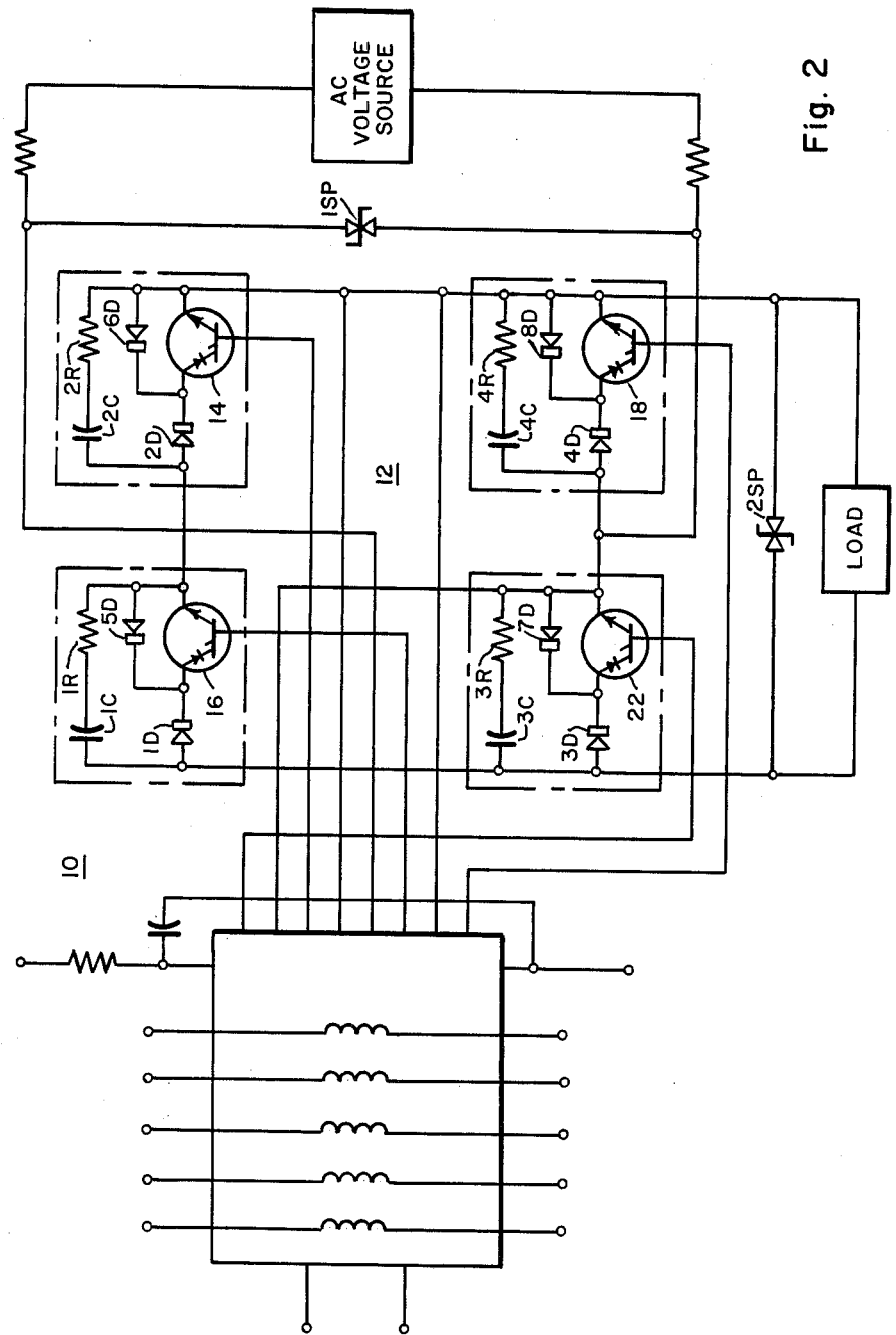
FIG. 2 is a schematic showing of the converter bridge circuits showing the circuit connection of the three terminal silicon semiconductor controlled rectifier devices.

In FIG. 2 there is shown a more detailed schematic of the bridge circuit portion of one converter device, for example the bridge circuit 12 operative with the converter device 10. The bridge circuit 12 includes in each branch a silicon controlled rectifier device 14, 16, 18 and 22 as diagrammatically shown in FIG. 1. The respective diodes 1D through 8D have the purpose of protecting the expensive silicon controlled rectifier devices 14, 16, 18 and 22. The resistor capacitor networks 1R–1C to 4R–4C are transient voltage filters necessary because of the hole recovery phenomena in the semiconductor devices. The selenium surge suppressor 1SP clamps the transients occurring when switching the supply transformer and the other surge suppressor 2SP serves as a discharge path for the stored energy in the load reactance in case of an accidental shutdown of the converter device 10.

The firing angle $\alpha$ for proper inverter operation has to remain below 180°. If the firing angle $\alpha$ should exceed 180° the converter would change to a rectification mode. Another type of fault would occur if while inverting the gating pulses would become absent. The pair of silicon controlled rectifiers last fired would stay in conduction to supply the A.C. line voltage to the inductive load until the D.C. component of the load current had died down. To prevent such malfunctions the pulse position modulator is designed so that the gating pulses never can be retarded more than to $\alpha$ equal 170°.

With the two converter devices connected back-to-back as shown in FIG. 1 the two converter devices are controlled together in such a manner that the firing angle $\alpha_1$ of the converter 10 and the firing angle $\alpha_2$ of the converter 20 should add up to 180°. The smoothing reactors 70 and 72 are desired to limit the current due to the instantaneous differences between the output voltage V1 of the converter 10 and the output voltage —V2 (minus V2) of the converter 20. Each of the converter devices 10 and 20 is capable of delivering 20 amperes of direct current at an output voltage range of approximately plus or minus 200 volts D.C. The internal bias of each pulse position modulator is set to a position of $\alpha_1$ being equal to $\alpha_2$, and each approximately 95°. At this point the two converter currents will sharply increase and provide a steady circulating current.

Before applying voltage to the power circuit in each converter device, it is necessary to determine that the silicon control rectifiers are gated at the proper firing angle. To do this the sequence has to be such that power is applied to the pulse position modulators at least one-half second before the main power is applied. The relay contacts OR and TR have been provided for this purpose. The transformer 30 for the converter device 10 is separate from the transformer 31 for the converter device 20 to keep the commutation transients of the two converter devices separate from each other.

In a practical test of the present power control apparatus, the load 36 was the field winding of a 500 kilowatt generator having a resistance of 5.3 ohms and an inductance of approximately 12 henries. The two firing angles $\alpha_1$ and $\alpha_2$ were each set to 92°, and not to the theoretical value of $\alpha_1$ equal $\alpha_2$ equal 90° for zero output current. This assures a minimum steady circulating current and is therefore desirable as long as the transfer from one converter to the other is substantially linear.

In FIG. 3 there is illustrated in curve 90 the output voltage V1 supplied by the converter device 10 for a firing angle $\alpha_1$ of 60°. The curve 92 shows the output voltage V2 from the converter device 20 with a firing angle $\alpha_2$ of 120°. The curve 94 illustrates the signal $$V_{1L} = V_{2L} = \frac{V_1 + V_2}{2}$$

The signal $V_{1L}$ is the voltage across the reactor 70, and the signal $V_{2L}$ is the voltage across the reactor 72. The curve 96 illustrates the signal $$V_0 = \frac{V_1 - V_2}{2}$$

supplied to the load 36.

In the operation of the present control apparatus it will be seen with reference to the schematic showing in FIG. 1 that the energization of the control windings 74 and 76 is dependent upon any difference in the voltage drop across the respective impedance members 60 and 62. The energization of control windings 71 and 73 is dependent upon the voltage drop across impedance member 64. In order to obtain a smooth overall transfer curve the two converter devices 10 and 20 have to be matched in such a way that the rectifier voltage of one converter device equals the inverter voltage of the other. This is very difficult as the transfer curves of the individual converter devices are rarely the same.

In FIG. 4 there is provided a showing of illustrative and practical curves of the respective converter devices 10 and 20; in the first quadrant the converter 20 is working as an inverter and the converter 10 is functioning as a rectifier with the voltage of the latter exceeding the voltage of the first. This would cause a circulating current limited only by the internal impedance of each converter.

If no circulating current flows the following relationships would be true. The load current would equal the current of the converter 10 and the converter 20 would operate with a zero current. With the converter 20 functioning as a rectifying device the load current would equal the current of the converter 20 and the converter 10 would provide a zero current. Further with no circulating current present the voltage drop across the impedance member 60 would equal the impedance drop across the impedance member 64, assuming that impedance member 60 is substantially equal to impedance member 62 and to impedance member 64. Thusly, when the net voltage drop across the impedance members 62 and 60 is substantially the same as the voltage drop across the impedance member 64, no circulating current would flow. However, if the voltage drop across the impedance member 60 is greater than the voltage drop across the impedance member 64, this will indicate the presence of circulating currents between the converter devices 10 and 20. The net difference between the voltage drops across the combined impedance members 60 and 62, as compared to the impedance member 64 is used to eliminate objectionable circulating current. The net voltage drop across impedance members 60 and 62 is applied to control windings 74 and 76. The voltage drop across impedance 64 is applied to control windings 71 and 73 in the converter devices 10 and 20 for the purpose of removing this circulating current.

In actual practice it is desired that the circulating current would be adjusted to approximately three to five percent for the purpose of providing a smooth transfer from rectifier to inverter operation and vice versa. If the voltage drop across impedance members 60 and 62 exceeds the voltage drop across impedance member 64, then the current in control windings 74 and 76 will be larger than the current in the control windings 71 and 73. This causes converter 10 to retard its firing angle $\alpha_1$ and retards the firing angle $\alpha_2$ of converter 20. This reduces voltage outputs of each converter device to reduce the circulating current.

In general, current flow in the control windings into the polarity dot as marked in FIG. 1 advances the firing angle of the respective converter devices and current flow away from the polarity dot retards the firing angle of the respective converter devices.

If converter 10 is rectifying and converter 20 is inverting, and the voltage drop across impedance members 60 and 62 exceeds the voltage drop across impedance member 64, then current flow in control windings 76 and 74 will be in an even to odd direction to retard the firing angle of each converter device 10 and 20. The current flow in control windings 71 and 73 will be in odd to even direction to advance the firing angle. The net control effect will be to retard the firing angles. This assumes the impedances 27 and 29 are substantially equal and substantially larger than values of each of impedance members 60, 62 and 64. If converter 20 is rectifying and converter 10 is inverting, the same operation will prevail, such that any voltage drop across combined impedance members 60 and 62 which exceeds voltage drop across impedance members 64, will result in retarding the firing angles of respective converter devices 10 and 20.

If the voltage drop across combined impedance members 60 and 62 does not exceed voltage drop across impedance member 64, the control windings 74 and 76 are energized substantially the same as control windings 71 and 73 to result in no change in the firing angles of converter devices 10 and 20.

While but one embodiment of the present invention has been disclosed, it is to be understood that the invention is capable of various adaptations and modifications within the spirit of the present invention.

We claim as our invention:

1. In power control apparatus operative between a source of electrical power and a load, the combination of converter means selectively operative as one of the rectifier means and an inverter means for controlling the supply of electrical power between said power source and said load, said converter means including current conducting means having a controllable output current firing angle, first current sensing means connected with said load for providing a first control signal in accordance with the current supplied to said load, second current sensing means connected with said converter means for providing a second control signal in accordance with the current supplied to said load by said converter means, and control means coupled to said current conducting means and responsive to each of said first and second control signals for controlling said output current firing angle as a predetermined comparison of said first control signal and said second control signal such that the transfer by said converter means between operation as a rectifier means and operation as an inverter means is thereby controlled.

2. In power control apparatus operative between a source of electrical power and a load, the combination of a pair of converter devices for controlling the supply of electrical power between said power source and said load, each said converter device including current conducting means having a controllable current conduction, first current sensing means coupled to the load for providing a first control signal in accordance with the current supplied to said load, second current sensing means coupled to the load for providing a second control signal in accordance with the current supplied by at least one of said converter devices, and control means coupled to said current conducting means for each converter device for retarding said output current conduction of at least said one converter device when said second control signal exceeds said first control signal.

3. In power control apparatus operative to control the energization of a load by an electrical power source, first converter means connected to said load to be conductive in one direction relative to said load and second converter means connected to said load to be conductive in another direction relative to said load, with each converter means including a current controlling member having a variable conduction firing angle, first current sensing means coupled with the load to provide a first control signal in accordance with the current supplied to said load, second current sensing means coupled with the first converter means for providing a second control signal having a first value in accordance with the current supplied by said first converter means, third current sensing means coupled with the second converter means for providing a third control signal having a second value in accordance with the current supplied by said second converter means, and load energization control means coupled with the current controlling member of each converter means for controlling the respective variable conduction firing angle in response to a predetermined comparison of said first control signal with a combination of said second control signal and said third control signal.

4. In power control apparatus for controlling the energization of a direct current load by an alternating current electrical power source, first converter means and second converter means each being operative selectively as a rectifier or an inverter, with each converter means including a current controlling member having a variable conduction current, first current sensing means connected to the load to provide a first control signal in accordance with the direct current supplied to said load, second current sensing means connected to the first converter means for providing a second control signal in accordance with the current supplied by said first converter means, third current sensing means connected to the second converter means for providing a third control signal in accordance with the current supplied by said second converter means, and load energization control means connected to the current controlling member of each converter means for controlling the respective variable conduction currents in response to a predetermined combination of one of said control signals compared with the other two control signals, such that a variation of said conduction currents is effected to provide a desired transfer between the rectifier operation and the inverter operation of each converter means.

5. In current control apparatus operative between a source of electrical power and a load, the combination of a pair of converter devices connected for controlling the supply of electrical current between said power source and said load, with each of said converter devices including current conducting means having a controllable conduction characteristic and each being operative selectively as one of a rectifier and an inverter, first current sensing means connected in series with said load for providing a first control signal in accordance with the load current, second current sensing means connected in series with at least one of said converter devices for providing a second control signal in accordance with the current supplied by at least said one converter device, and current control means connected to said current conducting means of each said converter device for controlling the respective conduction characteristics as a predetermined relationship to the current supplied by said one converter device by comparing said first control signal and said second control signal to selectively operate said converter devices respectively with one as a rectifier and the other as an inverter for controlling the supply of power to said load.

6. In power control apparatus operative to control the energization of a load by an electrical power source, first converter means and second converter means, with each converter means including a current controlling member having a variable conduction period, a first impedance member connected with the load to provide a first control signal in accordance with the current supplied to said load, a second impedance member connected with the first converter means for providing a second control signal in accordance with the current supplied to said load by said first converter means, a third impedance member connected with the second converter means for providing a third control signal in accordance with the current supplied to said load by said second converter means, with each of said first, second and third impedance members having predetermined and related impedance values, and load energization control means connected with said impedance members to energize the current controlling member of each converter means for controlling the respective variable conduction periods in response to a predetermined comparison of said first control signal with said second control signal and said third control signal.

References Cited by the Examiner
UNITED STATES PATENTS

| 2,071,805 | 2/37 | Von Issendorff | 321—27 |
| 3,071,720 | 1/63 | Geissing | 321—18 |

FOREIGN PATENTS 419,663  11/34  Great Britain.

LLOYD McCOLLUM, *Primary Examiner.*
ROBERT L. SIMS, *Examiner.*